United States Patent
Lin et al.

(10) Patent No.: US 10,034,408 B1
(45) Date of Patent: Jul. 24, 2018

(54) LOCKING DEVICES

(71) Applicant: HEWLETT PACKARD ENTERPRISE DEVELOPMENT LP, Houston, TX (US)

(72) Inventors: Phoebus Lin, Taipei (TW); Hsiu Hsien Wang, Taipei (TW)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/484,272

(22) Filed: Apr. 11, 2017

(51) Int. Cl.
*H05K 7/00* (2006.01)
*H05K 5/00* (2006.01)
*H05K 7/14* (2006.01)

(52) U.S. Cl.
CPC ................... *H05K 7/1489* (2013.01)

(58) Field of Classification Search
CPC ....................................................... G06F 1/16
USPC ..................................................... 361/679.01
See application file for complete search history.

(56) References Cited

U.S. PATENT DOCUMENTS

| | | | |
|---|---|---|---|
| 6,980,429 B2 | 12/2005 | Ericks | |
| 7,036,783 B2 | 5/2006 | Chen | |
| 7,088,580 B2 | 8/2006 | Chen | |
| 7,542,277 B2 | 6/2009 | Chen | |
| 7,663,873 B2 | 2/2010 | Lau | |
| 8,061,535 B2 | 11/2011 | Cheng | |
| 2006/0139871 A1* | 6/2006 | Chen | G06F 1/184 361/679.39 |

OTHER PUBLICATIONS

Adding or Replacing a CD or DVD Drive in Compaq Presario Sr5000 Series PCs, Retrieved on Mar. 30, 2017, http://support.hp.com/us-en/document/c00996023>.
Install an Additional Sata Hard Drive, Jan. 6, 2013, <https://www.youtube.com/watch?v=aSG89P-ks3o.
Optiplex 780 Mini Tower (MT) Removal Guide for the System Cover, Drive Cover, Optical Drive, Hard Drive and Memory, Retrieved from Internet Mar. 30, 2017, –http://www.dell.com/support/article/us/en/04/SLN289358/optiplex-780-mini-tower--mt-removal-guide-for-the-system-cover--drive-cover--optical-drive--hard-drive-and-memory?lang=EN>.

* cited by examiner

*Primary Examiner* — Jerry Wu
(74) *Attorney, Agent, or Firm* — Hewlett Packard Enterprise, Patent Department

(57) ABSTRACT

Examples herein relate to locking devices. In one example, a locking device comprises a metal sheet, the metal sheet comprising an elongated flexible arm established on a same plane as the metal sheet. The arm comprises an attached proximate end, a detached distal end, an elongated slot, the slot defining two opposite elongated edges and a locking bridge comprising an inclined surface. The locking bridge connects the two opposite edges by the detached distal end and the inclined surface of the locking bridge is adapted to retain a protrusion of the memory module.

18 Claims, 5 Drawing Sheets

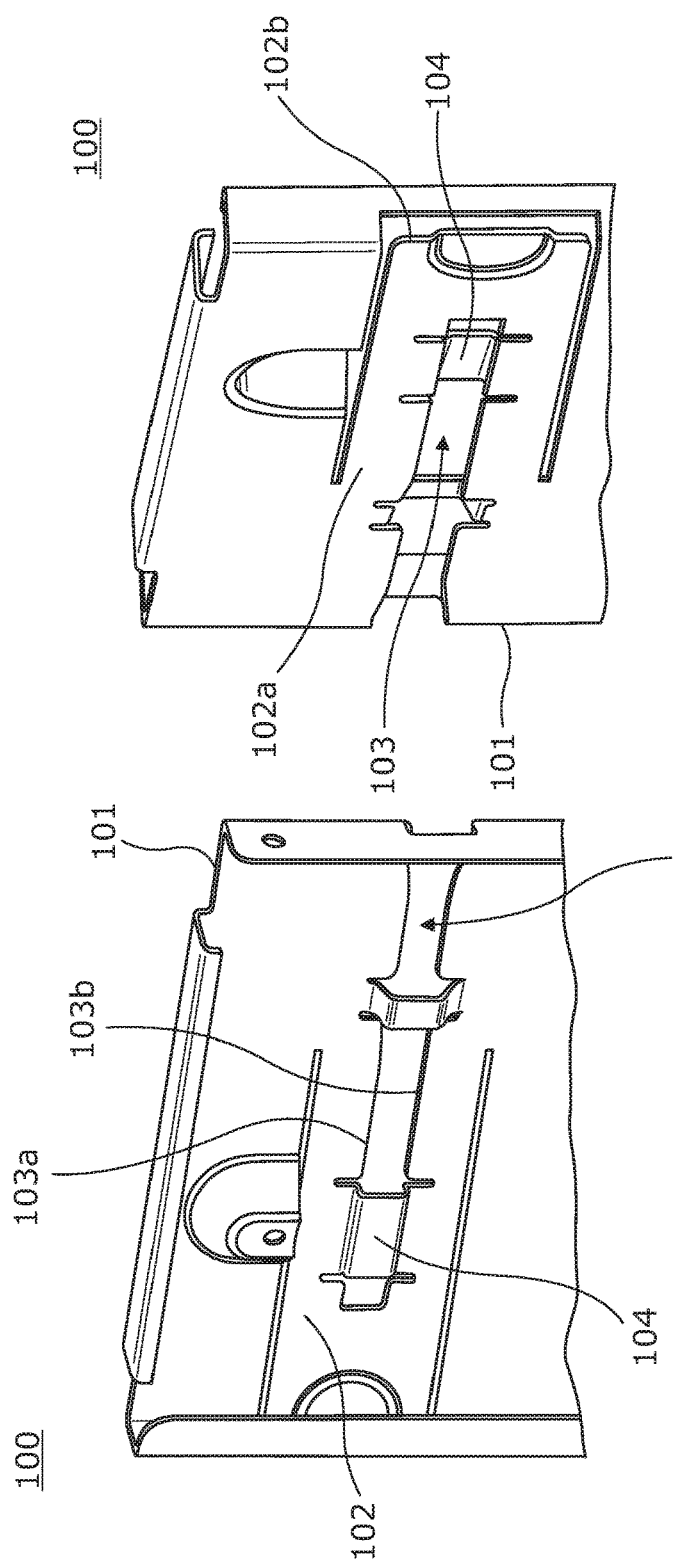

LOCKING DEVICES

BACKGROUND

Memory modules may be safely secured by means of locking devices in storage servers. A locking device that can safely secure one or more memory modules and be easily manufactured with a minimum number of components is desired.

BRIEF DESCRIPTION OF THE DRAWINGS

FIGS. 1A and 1B illustrate views of front and rear surfaces of an example of a locking device according to the present disclosure.

DETAILED DESCRIPTION

Figure 2A:
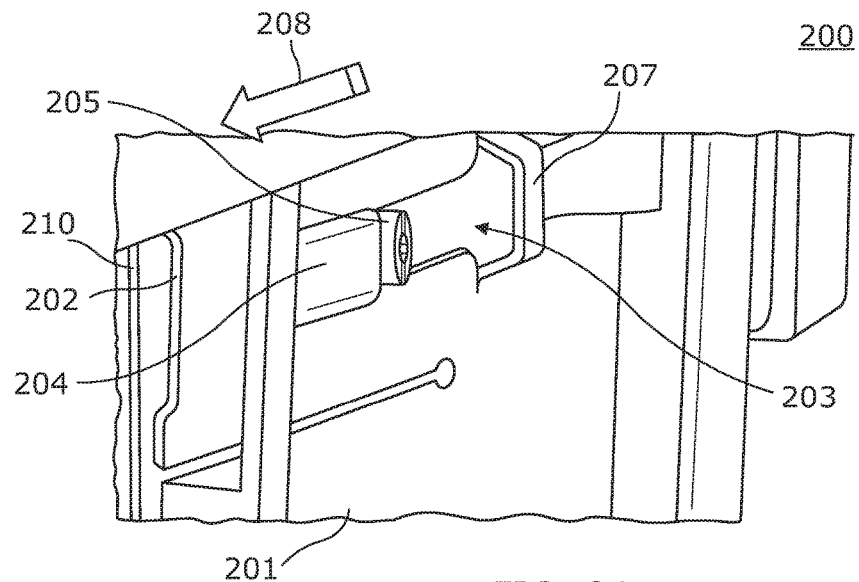
FIGS. 2A and 2B illustrate an example of a locking device according to the present disclosure being used during a locking phase.

The examples of memory modules that can be locked by examples of the locking device shown in the present disclosure can be e.g. Hard Disk Drive (HDD), a magnetic Tape or an Optical Disk Drive (ODD), Solid State Drive (SSD), Non-Volatile Memory Host Express (NVMe), etc. These memory modules can be inserted or removed into or from, as examples, a fabric attached memory pool, storage servers, rack servers, etc.

FIG. 1A shows a view of a front surface of an example of a locking device 100 according to the present disclosure. FIG. 1B shows a view of a rear surface of the same example of the locking device 100 according to the present disclosure. The locking device 100 comprises a metal sheet 101. The metal sheet 101 comprises an elongated flexible arm 102 established on the same plane as the metal sheet 101. The elongated flexible arm 102 comprises an attached proximate end 102a and a detached distal end 102b as shown in FIG. 1B. The elongated flexible arm 102 can provide a spring force function based on a predefined shape design of the elongated arm shown in FIG. 1A and FIG. 1B. The predefined shape design of the elongated arm can also avoid bending deformation of the locking device.

Furthermore, the locking device 100 comprises an elongated slot 103, the slot 103 can define two opposite elongated edges 103a and 103b. The arm 102 further comprises a locking bridge 104 having an inclined surface. The locking bridge 104 can connect the two opposite edges 103a and 103b by the detached distal end 102b. The inclined surface of the locking bridge 104 can retain a protrusion of a memory module after the protrusion passing under the locking bridge. In some examples, the protrusion can be a screw of the memory module.

Figure 2B:
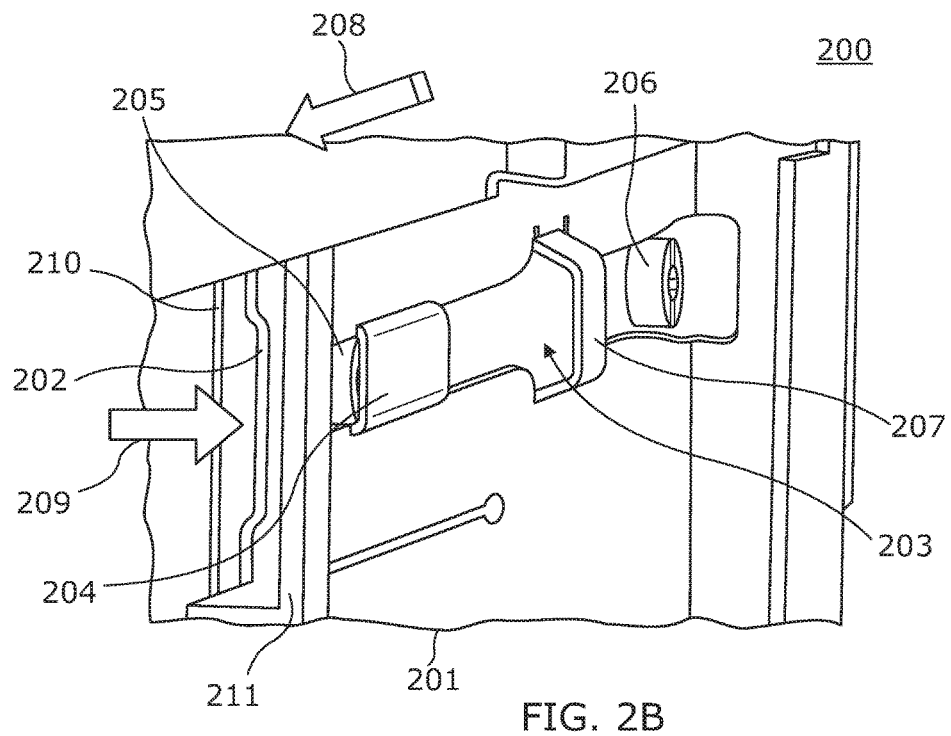

FIGS. 2A and 2B show an example of a locking device 200 being used during a locking phase for locking a memory module 210. In particular, FIG. 2A shows a view of a front surface of the locking device 200 that comprises a metal sheet 201. The metal sheet 201 comprises an elongated flexible arm 202 established on the same plane as the metal sheet 201. The arm 202 further comprises a locking bridge 204 with an inclined surface. The inclined surface of the locking bridge 204 can retain a protrusion of a memory module 210 after the protrusion passing under the locking bridge 204. In this particular example, the protrusion is a screw 205 of the memory module 210 that faces the rear surface of the locking device 200. Furthermore, the locking device 200 comprises a support bridge 207. The support bridge 207 can increase the stiffness of the locking device 200.

During the locking phase shown in FIG. 2A, the memory module 210 is moved on a first direction shown by the arrow 208 which may be parallel to the rear surface of the locking device 200 that faces the memory module 210. The longitudinal movement of the memory module 210 in the direction shown by the arrow 208 can be applied towards the locking bridge 204 as shown in FIG. 2A. During the locking phase, the screw 205 is railed via the slot 203 formed on the flexible arm 202 of the locking device 200 during the movement of the memory module 210.

As shown in FIG. 2B, the screw 205 has passed under the locking bridge 204 established on the slot 203 formed on the flexible arm 202. During the passing of the screw 205 under the locking bridge 204, the screw 205 can make the flexible arm 202 to slightly move in the direction shown by the arrow 209 (e.g. a direction perpendicular to the front surface of the locking device 200) as a cavity found under the bridge 204 may not be enough space for the screw 205 to pass. FIG. 2B additionally shows a second screw 206 which is part of the memory module 210.

Upon passing the screw 205 under the locking bridge 204, the memory module 210 can be locked by the locking device 200 by retaining the screw 205 in a space created between the locking bridge 204 and an end of the slot 203. Due to the inclined surface of the locking bridge 204, performing a movement of the memory module 210 in a second direction opposed to the first direction shown by the arrow 208 is not possible due to a mechanical confrontation between the screw 205 and the inclined surface of the locking bridge 204.

Figure 3:
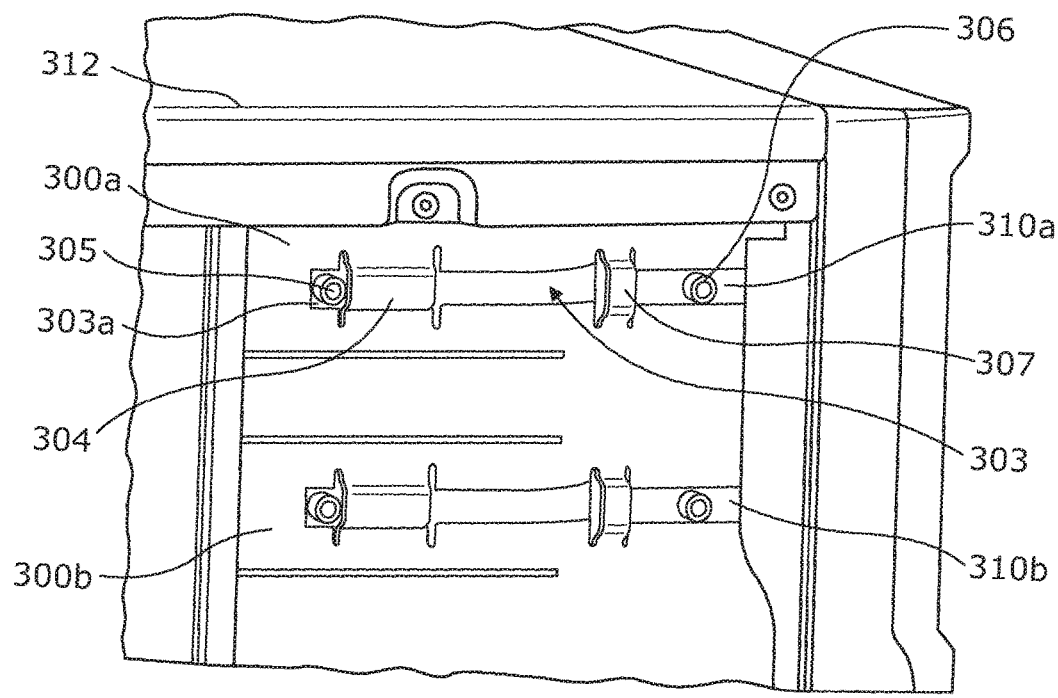
FIG. 3 illustrates an example of two locking devices locked to two memory modules.

FIG. 3 shows a storage server 315 enclosing two memory modules 310a and 310b locked by the examples of locking devices 300a and 300b, respectively. The locking devices 300a and 300b can perform the locking of the memory modules 310a and 310b to the storage server 315. In this particular example FIG. 3 shows two locking devices 300a and 300b in a parallel distribution. For example, the memory module 310a can be locked by the locking device 300a by retaining the screw 305 of the memory module 310a in a space created between the locking bridge 304 and an end 303a of the slot 303.

Furthermore, FIG. 3 shows that the memory module 310a comprises a second screw 306 and that the locking device 300a comprises a support bridge 307. The support bridge 307 can increase the stiffness of the locking device 300a.

Figure 4:
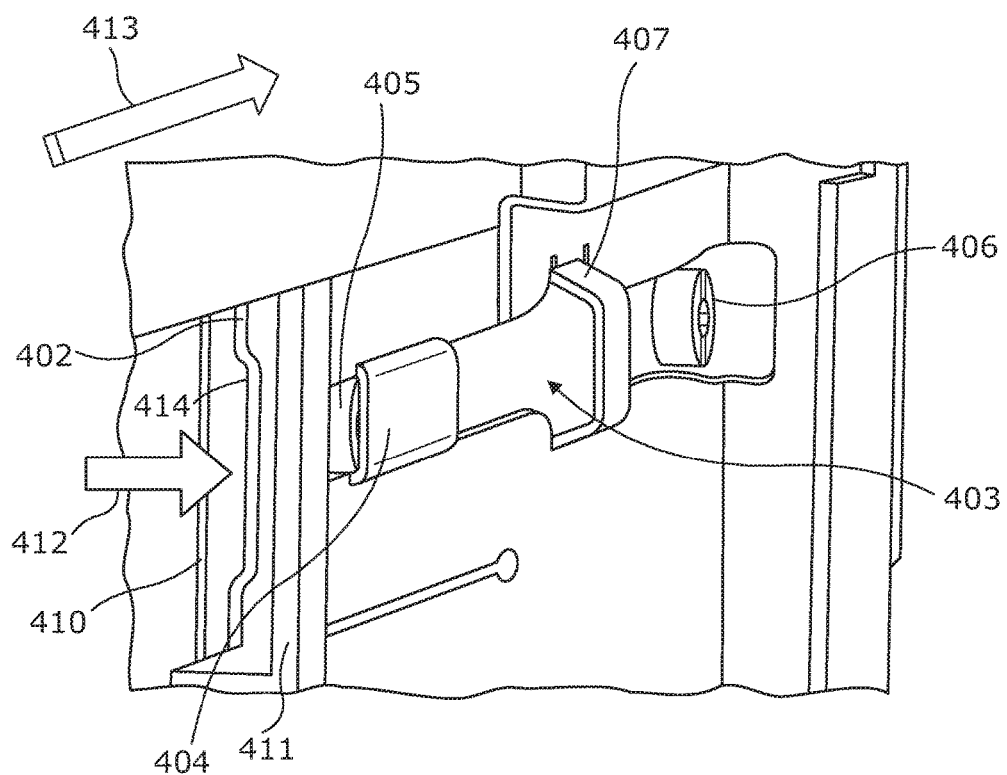
FIG. 4 illustrates an example of a locking device being used during an unlocking phase according to the present disclosure.

FIG. 4 shows an example of a locking device 400 being used during the unlocking phase for unlocking a memory module 410. The locking device 400 comprises a metal sheet 401. The metal sheet 401 comprises an elongated flexible arm 402 established on the same plane as the metal sheet 401. The arm 402 further comprises a locking bridge 404 with an inclined surface and a notch 414 located by the detached distal end of the arm 402 that can facilitate gripping of the arm 402.

During the unlocking phase, firstly the user or operator may apply a pulling force having a direction shown by the arrow 412 by gripping the notch 414 and pulling the detached distal end of the flexible arm. By applying this pulling force, the flexible arm 402 and the locking bridge 404 can be moved in the direction shown by the arrow 412 e.g. on a direction perpendicular to the front surface of the locking device 400. By pulling the arm 402, the cavity found under the locking bridge 404 increases. This increase of the cavity can permit the screw 405 to pass under the locking bridge 404. The locking device 400 further comprises a barrier 411 that faces the detached distal end of the flexible arm 402 so that the pulling force applied to the arm 402 can be braked by the barrier 411 in order to avoid a loss of shape of the locking device 400.

Secondly, after applying the pulling force in the direction shown by the arrow 412, a movement of the memory module 410 on a second direction 413 opposed to the first direction (i.e. the direction 208 shown in FIGS. 2A and 2B) can be applied in order to unlock the memory module 410. Hence, the memory module 410 can be moved on a direction shown by the arrow 413 by applying a longitudinal movement which may be parallel to the rear surface of the locking device 400 that faces the memory module 410. The longitudinal movement having a direction shown by the arrow 413 can be applied to the memory module 410 in a way that permits the screw 405 to pass under the locking bridge 404 which was previously slighted elevated as shown in FIG. 4. During the unlocking phase, the screw 405 can be freely railed via the slot 403 formed on the flexible arm 402 of the locking device 400 after applying firstly the transversal movement 412 and secondly the longitudinal movement 413.

Figure 5:
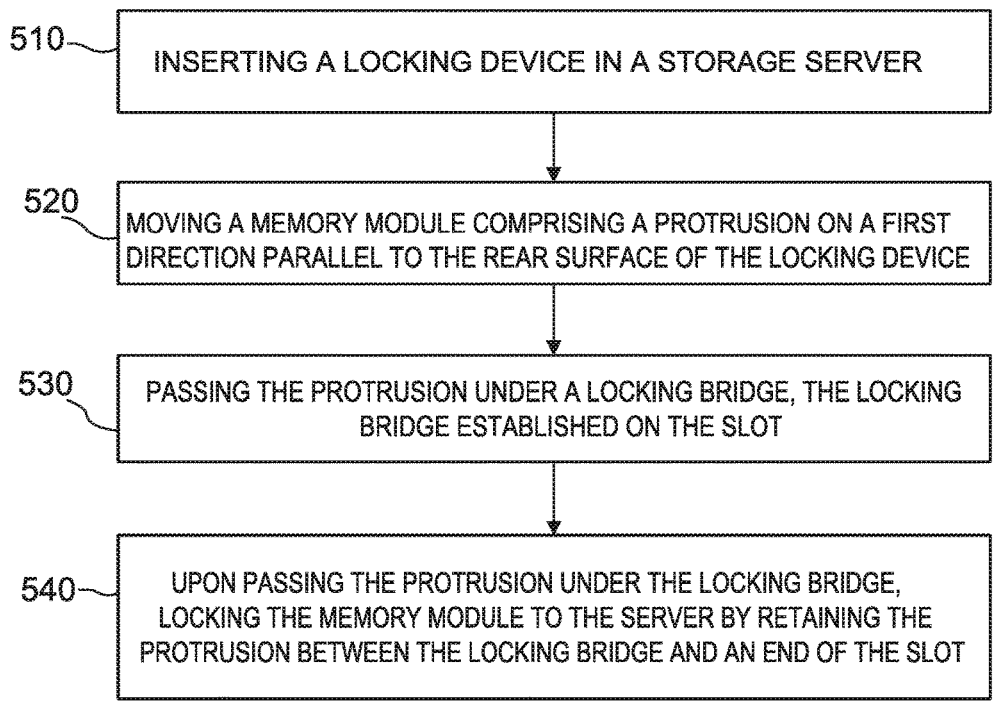
FIG. 5 illustrates an example of a flowchart for locking a memory module according to the present disclosure.

FIG. 5 shows an example of a flowchart 500 for locking a memory module according to FIG. 2. The flowchart 500 comprises step 510 for inserting a locking device in a storage server, the locking device comprising a front surface and a rear surface.

The flowchart 500 comprises step 520 for moving a memory module comprising a protrusion on a first direction parallel to the rear surface of the locking device. During the movement of the memory module on the first direction, the protrusion can be railed via an elongated slot formed on a flexible arm of the locking device. The types of memory modules that can be locked by examples of the locking devices shown in the present disclosure can be e.g. a Hard Disk Drive (HDD), a magnetic Tape or an Optical Disk Drive (ODD), a Solid State Drive (SSD), a Non-Volatile Memory Host Express (NVMe), etc. The memory modules can be inserted into or removed from as e.g. a fabric attached memory pool, storage servers, rack servers, etc. In some examples, the protrusion can be located on the back of the memory module. In some other examples, the protrusion can be located on a side of the memory module. In some examples, the protrusion can be a screw of the memory module.

The flowchart 500 comprises step 530 for passing the protrusion under a locking bridge, the locking bridge can be established on the slot formed on the flexible arm. The locking bridge can comprise an inclined surface that can retain the protrusion of the memory module after the protrusion passing under the locking bridge. During the passing of the protrusion under the locking bridge, the protrusion can make the flexible arm to slightly move in a direction perpendicular to the front surface of the locking device as a cavity that can be found under the locking bridge may not be enough space for the protrusion to pass.

The flowchart 500 comprises step 540 for upon passing the protrusion under the locking bridge, locking the memory module to the storage server with the locking device by retaining the protrusion in a space created between the locking bridge and an end of the slot. Due to the inclined surface of the locking bridge, performing a movement of the memory module on a second direction opposed to the first direction and parallel to the rear surface of the locking device cannot be possible due to mechanical confrontation between the retained protrusion and the inclined surface of the locking bridge.

Furthermore, the flowchart 500 can further comprise steps that relate to the locking device being used during an unlocking phase to unlock the memory module according to FIG. 4. Hence, the flowchart 500 further comprises a step for applying a pulling force to a detached distal end of the flexible arm of the locking device to slightly elevate the detached distal end of the flexible arm on a direction perpendicular to the front surface of the locking device. This pulling force applied to the detached distal end of the flexible arm can permit unlocking the memory module. Furthermore, the flowchart 500 further comprises a step for upon elevation of the detached distal end of the flexible arm above the front surface of the locking module, moving the memory module on the second direction opposed to the first direction (i.e. the direction applied in step 520).

Furthermore, the flowchart 500 further comprises a step for passing the protrusion under the locking bridge in order to release the protrusion of the memory module. The movement of the memory module on the second direction opposed to the first direction applied in step 520 can permit the protrusion to pass under the locking bridge in order to release the protrusion.

Upon passing the protrusion under the locking bridge, the flowchart 500 further comprises a step for unlocking the memory module from the storage server by removing the memory module. The protrusion may not be retained anymore by the locking bridge at this stage of the unlocking phase so the memory module can be freely removed from the storage server.

Furthermore, relative terms used to describe the structural features of the figures illustrated herein are in no way limiting to conceivable implementations. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

The invention claimed is:

1. A locking device for a memory module, the locking device comprising:
   a metal sheet, the metal sheet comprising an elongated flexible arm established on a same plane as the metal sheet to provide a spring force;
   the elongated flexible arm comprises:
   an attached proximate end of the elongated flexible arm;
   a detached distal end coupled to and extending from the attached proximate end, wherein the detached distal end comprises a notch established on the detached distal end;
   an elongated slot, the slot defining two opposite elongated edges; and a locking bridge,
  wherein the locking bridge is located on the detached distal end and connects the two opposite elongated edges at the detached distal end, and
  wherein the locking bridge is adapted to retain a protrusion of the memory module.

2. The locking device of claim 1, wherein the arm further comprises a support bridge located at the attached proximate end and that connects the two opposite elongated edges at the attached proximate end.

3. The locking device of claim 2, wherein the protrusion of the memory module is a screw.

4. The locking device of claim 1, wherein the memory module is one of a Hard Disk Drive (HDD), a magnetic Tape or an Optical Disk Drive (ODD), Solid State Drive (SSD), and Non-Volatile Memory Host Express (NVMe).

5. The locking device of claim 1, wherein the locking device further comprises more than one flexible arm.

6. The locking device of claim 1, wherein the metal sheet further comprises a barrier facing the detached distal end so that a transversal movement of the arm is braked by the barrier.

7. A method for locking a memory module, the method comprising:
  inserting a locking device in a server, the locking device comprising a front surface and a rear surface;
  moving a memory module comprising a protrusion on a first direction parallel to the rear surface of the locking device,
    wherein the protrusion is railed via an elongated slot formed on a flexible arm of the locking device during the movement of the memory module;
  applying a pulling force to a detached distal end of the flexible arm to elevate the detached distal end of the flexible arm on a direction perpendicular to the front surface of the locking device;
  passing the protrusion under a locking bridge when the detached distal end of the flexible arm is elevated, the locking bridge established on the slot formed on the flexible arm; and
  upon passing the protrusion under the locking bridge, locking the memory module to the server with the locking device by retaining the protrusion in a space created between the locking bridge and an end of the slot.

8. The method of claim 7, wherein the protrusion is located on a back of the memory module.

9. The method of claim 7, wherein the protrusion is located on a side of the memory module.

10. The method of claim 7, further comprising:
moving the memory module on a second direction parallel to the surface of the locking device and opposed to the first direction upon elevation of the detached distal end of the flexible arm.

11. The method of claim 10, further comprising:
passing the protrusion under the locking bridge to release the protrusion of the memory module.

12. The method of claim 11, further comprising:
upon passing the protrusion under the locking bridge, unlocking the memory module from the server by removing the memory module.

13. The method of claim 12, further comprising locking a plurality of memory modules with the locking device.

14. A system, the system comprising:
  a server;
  a plurality of memory modules contained in the server; and
  a plurality of locking devices to lock the plurality of memory modules in the server,
  wherein each of the locking devices comprises:
    a metal sheet, the metal sheet comprising an elongated flexible arm established on a same plane as the metal sheet to provide a spring force;
    the elongated flexible arm comprises:
      an attached proximate end of the elongated flexible arm;
      a detached distal end coupled to and extending from the attached proximate end, wherein the detached distal end comprises a notch established on the detached distal end;
      an elongated slot, the slot defining two opposite elongated edges; and
      a locking bridge,
        wherein the locking bridge is located on the detached distal end and connects the two opposite elongated edges at the detached distal end, and
        wherein the locking bridge is adapted to retain a protrusion of a memory module.

15. The system of claim 14, wherein each of the locking devices from the plurality of locking devices comprises more than one flexible arm.

16. The system of claim 14, wherein each of the locking devices from the plurality of locking devices is made of metal or plastic.

17. The system of claim 14, wherein the memory module is one of a Hard Disk Drive (HDD), a magnetic Tape or an Optical Disk Drive (ODD), Solid State Drive (SSD), and Non-Volatile Memory Host Express (NVMe).

18. The system of claim 14, wherein the server is a rack server.

* * * * *